United States Patent
Minato et al.

(10) Patent No.: US 7,171,305 B2
(45) Date of Patent: Jan. 30, 2007

(54) NAVIGATION APPARATUS AND ACCESS METHOD TO MAP DATA THEREIN

(75) Inventors: Junji Minato, Iwaki (JP); Takuya Yasumura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 343 days.

(21) Appl. No.: 10/823,392

(22) Filed: Apr. 13, 2004

(65) Prior Publication Data
US 2004/0267446 A1 Dec. 30, 2004

(30) Foreign Application Priority Data
Apr. 18, 2003 (JP) .............................. 2003-113638

(51) Int. Cl.
*G01C 21/32* (2006.01)
*G11B 19/02* (2006.01)

(52) U.S. Cl. .................. 701/209; 701/200; 360/69
(58) Field of Classification Search ............... 701/209, 701/200; 360/69, 71; 340/988
See application file for complete search history.

(56) References Cited

U.S. PATENT DOCUMENTS 6,055,478 A * 4/2000 Heron ..................... 701/213
6,067,203 A * 5/2000 Ottesen et al. ........... 360/73.03
6,680,806 B2 1/2004 Smith
6,892,249 B1 * 5/2005 Codilian et al. ............... 710/5

FOREIGN PATENT DOCUMENTS

JP 09062183 A2 8/1995
JP 2001221645 A2 11/2000

* cited by examiner

*Primary Examiner*—Thomas Black
*Assistant Examiner*—Marie A Weiskopf
(74) *Attorney, Agent, or Firm*—Brinks Hofer Gilson & Lione

(57) ABSTRACT

A navigation apparatus is provided for ensuring safe execution of a navigation function even when a vehicle travels high altitude areas. The navigation apparatus has a function of searching for a route to a destination, and comprises the following structure: a memory device 30 for storing map data or the like, a data memory 70 for being capable of storing part of the map data or the like stored in the memory device 30, a position detector 500 for detecting positional information on a vehicle position, a controller 80 for causing the map data stored in the memory device 30 to be stored in a backup memory area 74 of the data memory 70 when the vehicle reaches a predetermined altitude based on the positional information, and a display controller 50 for displaying the map data read from the data memory 70 on a display device 51.

20 Claims, 6 Drawing Sheets

NAVIGATION APPARATUS AND ACCESS METHOD TO MAP DATA THEREIN

BACKGROUND OF THE INVENTION

1. Field of the Invention

The present invention relates to a navigation apparatus that searches for a route to a destination and guides a vehicle to the destination according to the guidance route searched for. More particularly, the invention is directed to an access control of a hard disk drive incorporated in a navigation apparatus when a vehicle is traveling areas located at high altitude.

2. Description of the Related Art

Navigation systems are designed to detect the present position of a vehicle to thereby read map data covering the present vehicle position and its surroundings from a storage medium, and to draw a map on a screen of a display with a vehicle mark superimposed on the map. In the systems, when the vehicle is moved and the present position thereof is changed, the map is scrolled accordingly, or the vehicle mark is moved on the map accordingly. This provides a user with easy to understand map information about the periphery of the vehicle position.

The navigation systems have the function of searching for a route to a destination set by a user and guiding the vehicle along the route. The route guiding function is to search for or retrieve a cost-effective route connecting from the present vehicle position to the destination by the Dijkstra method or the like using map data, to store the route searched for in a memory as guidance route data, and to display the guidance route on a display device during traveling of the vehicle.

In recent years, some navigation systems incorporate an audio function as well as a navigation function. Such a system can be used to reproduce both a CD-ROM for music and a CD-ROM which stores therein information on maps or the like needed for the navigation. Thus, there is a disadvantage that when reproducing one storage medium, the system cannot reproduce the other storage medium.

To eliminate the above mentioned disadvantage, Japanese Unexamined Patent Publication No. 9-62183 discloses navigation technology in which, even when a CD-ROM storing map data or the like is not loaded onto the vehicle, the map data is stored in another storage means, and a navigation function is available using the map data or the like stored in the storage means. Japanese Unexamined Patent Publication No. 2001-221645 discloses a navigation system that previously stores music data in a music data storage means to thereby perform a navigation function while reproducing music.

The emergence of a hard disk drive capable of storing large quantities of data encourage or stimulate the commercialization of navigation systems with the hard disk drive used as a storage medium. This drive has enough capacity to store not only data on maps but also different data, e.g., data on music, programs, and the like. The use of this hard disk drive as a single storage device permits concurrent execution of the navigation function and the audio function, thereby eliminating the disadvantage in utilizing a plurality of CD-ROMs as mentioned above.

However, the navigation systems using the hard disk drive have the following disadvantages. In order for the hard disk to store data in high density, a clearance between a magnetic head and the disk should be extremely small. In this system, a pressure caused by the viscosity of air which is generated by rotation of the disk causes the magnetic head to float above the disk. In a low atmospheric pressure, the clearance between the magnetic head and the disk cannot be maintained, which might result in destruction of the disk. In general, the hard disk guarantees an operating environment of an altitude up to about 3,000 m. Thus, when the vehicle with the navigation system mounted thereon is traveling roads at an altitude of about 3,000 m or above, e.g., 4,000 m or 5,000 m category (roads in the U.S.A., China, or the like), the hard disk might be damaged, leading to a failure in the navigation system.

SUMMARY OF THE INVENTION

The present invention is to solve the foregoing problems encountered with the known art, and it is an object of the present invention to provide a navigation apparatus that ensures safe execution of a navigation function even when a vehicle is traveling in high altitude areas.

Further, it is another object of the present invention to provide a navigation apparatus that prevents the occurrence of a failure in a hard disk drive storing map data or the like.

Furthermore, it is still another object of the present invention to provide a newly developed navigation apparatus by making improvements to the prior art, and an access method to the map data in the same.

According to the present invention, there is provided a navigation apparatus comprising a first memory section for storing at least map data, a second memory section for being capable of storing part of the map data stored in the first memory section, a position detector for detecting positional information on a position of a vehicle, a memory controller for retrieving the map data stored in the first memory section and storing it in the second memory section when the vehicle reaches a predetermined altitude based upon the positional information, and a display controller for displaying the map data read from the second memory section on a display device. Preferably, the first memory section may be a hard disk drive. If atmospheric pressure drops, the first memory section might not ensure its safe operation, or might cause damage to a magnetic disk. To avoid this risk, when the vehicle is traveling at or above a predetermined altitude, access to the first memory section is restricted, and map data read from the second memory section is displayed. Accordingly, even in areas where the use of the hard disk drive is restricted, the navigation apparatus is available.

Further, the navigation apparatus of the present invention may measure atmospheric pressure instead of measuring the altitude from positional information. When the atmospheric pressure measured is equal to or less than a predetermined value, the map data stored in the first memory section is stored in or saved to the second memory section, thus displaying the map data read from the second memory section on the display device. The predetermined value is preferably 0.7 atm, which corresponds to an altitude of about 3,000 m.

Further, the navigation apparatus of the present invention may comprise the following structure: a first memory device for storing at least map data, a second memory device for storing map data of areas located at or above a predetermined altitude, an altitude measuring section for measuring an altitude at a location where a vehicle is traveling, an access section for accessing the first memory device or the second memory device based upon a result measured by the altitude measuring section to read the map data from the first or second memory device, and a display controller for displaying the map data read by the access section on a display device. That is, the map data concerning the areas located at or above a predetermined altitude is stored in the second memory device in advance. When the vehicle is positioned at or reaches the predetermined altitude, the object to be accessed should be switched from the first memory device to the second memory device. Although the storage capacity of the second memory device has to be large, there is no need to copy the map data in the first memory device and save it in the second memory device.

Moreover, the navigation apparatus of the present invention may have the function of reproducing music and comprise the following structure: a magnetic storage medium for storing music data and map data, a memory device for being capable of storing the music data and the map data stored in the magnetic storage medium, a position detector for detecting positional information of a vehicle, a memory controller for causing the music data and the map data stored in the magnetic storage medium to be stored in the memory device when the vehicle reaches the predetermined altitude based upon the positional information, an audio output device for outputting the music data read from the memory device by sound, and a display controller for displaying the map data read from the memory device on a display device. With this arrangement, when the vehicle is located at or above the predetermined altitude, the music data stored in the magnetic storage medium is saved to the memory device, and the memory device can be accessed to reproduce the music.

In addition, the navigation apparatus of the present invention may comprise the following structure: a magnetic storage device for storing map data and route data concerning a guidance route retrieved to the destination, a memory device, a memory controller that, when the route data includes a road located at or above a predetermined altitude, transfers the map data of areas located at or above the predetermined altitude, from the magnetic storage device to the memory device, and a display controller for displaying on a display device a road map covering the areas, which are located at or above the predetermined altitude, based upon the map data stored in the memory device. In cases where the guidance route to the destination includes a road located at or above the predetermined altitude, the map data of the areas located at or above the altitude is saved to the memory in advance. When the vehicle travels the road located at or above the predetermined altitude, the map data from the memory device will be used to generate a map to be displayed on the display device.

According to the present invention, there is provided an access method to map data in a navigation apparatus, the method comprising the following steps: measuring an altitude at a location where a vehicle is traveling, saving map data stored in a first memory device to a second memory device when the vehicle reaches a predetermined altitude in the step of measuring, to access the second memory device, thereby reading the map data, and displaying the map data on a display device as a map.

DESCRIPTION OF THE PREFERRED EMBODIMENTS

Figure 1:
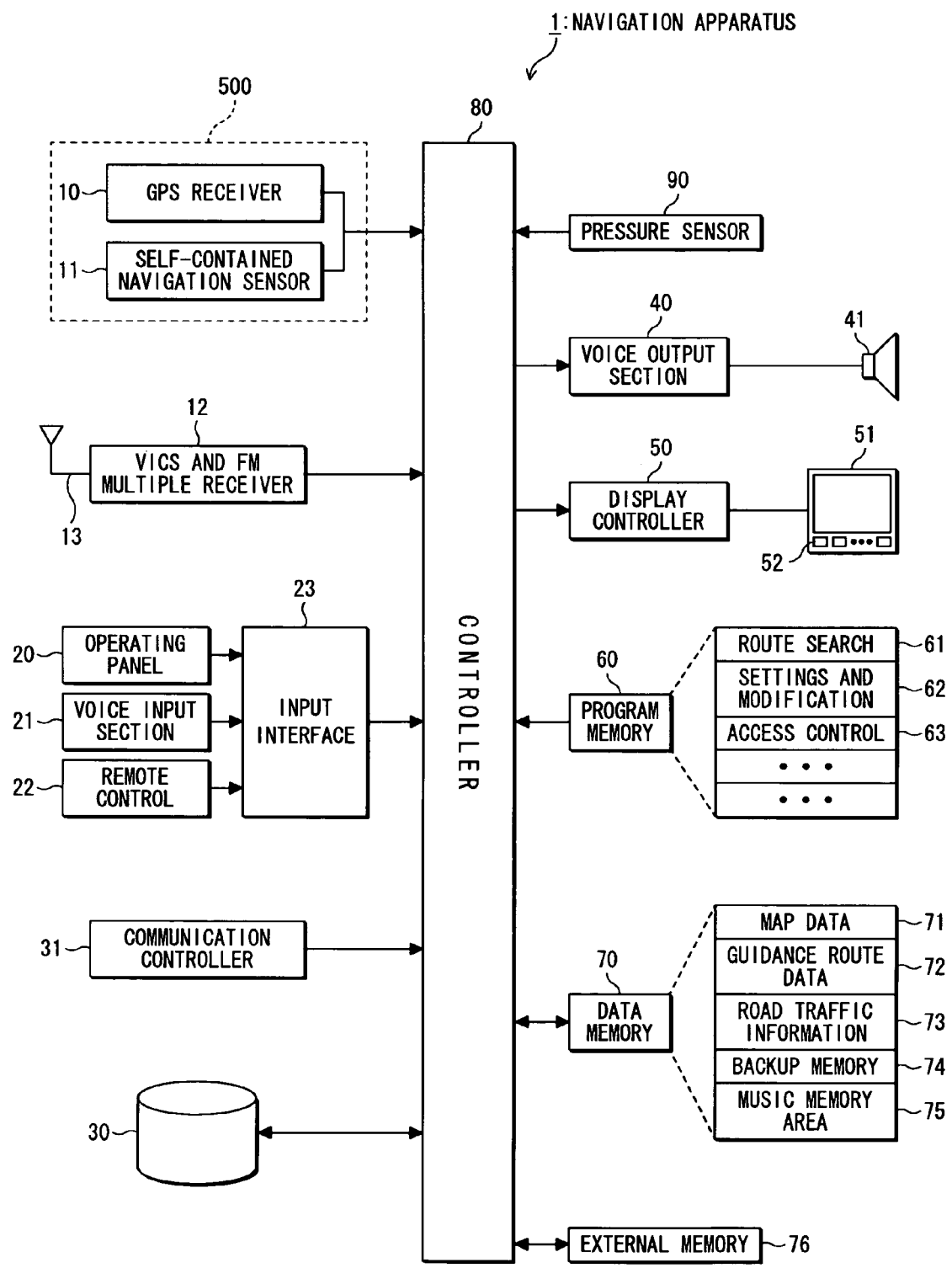
FIG. 1 is a block diagram showing the configuration of a navigation apparatus according to one preferred embodiment of the present invention.

Some preferred embodiments according to the present invention will be described below with reference to the accompanying drawings. FIG. 1 is a block diagram showing the configuration of a navigation apparatus according to one embodiment of the invention. A navigation apparatus 1 includes a position detector 500 incorporating a GPS receiver 10, and a self-contained navigation sensor 11, a vehicle information and communication system (VICS) and FM multiple receiver 12, an operating panel 20, a voice input section 21, a remote control operating section 22, an input interface 23, a memory device 30 serving as the first memory device for storing map data or the like, a voice output section 40, a speaker 41, a display controller 50, a display device 51, a program memory 60, a data memory 70 serving as the second memory device, and a controller 80 for controlling each section.

The position detector 500 includes the GPS receiver 10, and the self-contained navigation sensor 11. The GPS receiver 10 receives radio waves from a satellite (GPS satellite) to detect the present position of a vehicle and the present traveling direction thereof. Positional information detected includes data on latitude and longitude of the present vehicle position, and altitude thereof. The self-contained navigation sensor 11 includes a vehicle speed sensor for measuring a traveling distance of the vehicle, and an angle sensor for measuring an angle of rotation of the vehicle. Output signals from the GPS receiver 10 and the self-contained navigation sensor 11 are transmitted to the controller 80, which calculates the present position and traveling direction of the vehicle based upon these output signals.

The VICS and FM multiple receiver 12 successively receives present road traffic information around or outside the vehicle via an antenna 13. The VICS (Vehicle Information and Communication System), which provides the road traffic information in real time, sends the information by FM multiple broadcast (teletext broadcasting), a radio beacon, a light beacon, and the like. The FM multiple broadcast covers the road traffic information concerning a wide range of areas. The radio beacon and the light beacon include the road traffic information covering areas within about a 10 km radius of the center, and can receive the information when the vehicle passes through the beacon. The data transmitted from the VICS includes the level of traffic congestion, for example, a normal condition, a crowded condition, a congested condition, a distance of traffic congestion, a traffic rule, a traveling interval, or the like, with respect to a link corresponding to each road.

The operating panel 20, the voice input section 21, and the remote control operating section 22 composes input of the navigation apparatus 1. Through the use of these input means, a user provides the navigation apparatus 1 with various orders and settings, including a destination for which a route to will be searched for, a change in settings of a display screen, or the like. The operating panel 20 includes a plurality of available operating keys 52, for example, disposed on the lower portion of the display device 51. The voice input section 21 transmits the user's input voice from a voice inputting microphone not shown to the input interface 23, where a voice analogue signal is converted into a digital signal. The remote control operating section 22 includes a plurality of input keys. When the user operates the input key, a command for an input operation is transmitted to the input interface 23 through radio. The input interface 23 is connected to the operating panel 20, the voice input section 21, and the remote control operating section 22, to thereby transmit information inputted by the user to the controller 80.

A memory device 30 is a hard disk drive and stores databases or the like including map, road data, addresses, telephone numbers, and facilities, which are needed for the navigation apparatus. The memory device 30 can also store programs for executing various functions of the navigation apparatus. Particularly, in a case where the navigation apparatus has the audio function, the memory device 30 stores music data.

A data communication controller 31 sends and receives data by wireless communication. The data communication controller 31 may be a communication device for sending and receiving the data, which is incorporated in the navigation apparatus. The controller 31 may be a cellular phone or an electronic device having a communicating function installed externally to the navigation apparatus. The data communication controller 31 carries out data communication with an external server or the like over a network. For example, it sends and receives to and from a traffic information center such as ATIS or the like, data concerning the road traffic information, thereby continuously obtaining dynamic information in real time. The contents of the memory device 30 can be updated by downloading from the predetermined server the newest data about roads, maps, facilities, and music. Further, the data communication controller 31 is capable of providing the cellular phone with the road traffic information and entertainment information on facilities, restaurants, or the like, which information is stored in the navigation apparatus 1.

The voice output section 40 includes a speaker 41, and outputs voice from the speaker 41 under control of the controller 80. For example, it outputs by voice a message that a driver should pay attention to the traveling direction of the vehicle in front of an intersection, as information about the guidance route to the destination. Alternatively, when the user inputs the settings interactively into the navigation apparatus, the output section sends instructions for input operations to the user by voice. Additionally, the voice output section 40 plays music when the navigation apparatus carries out the audio function.

The display controller 50 connected to the display device 51 displays maps on the display device 51, or synthesizes a vehicle mark indicative of the present vehicle position, a route to the destination, a guidance display at intersections or the like, and a moving track of the vehicle, or the like, on the map based upon data read from the memory device 30 or the data memory 70 under the control of the controller 80. The instructions and information on operations inputted by the user from the operating panel 20 or the like are displayed on the map or on another screen. The display controller 50 preferably includes a VRAM such as FIFO or the like, stores in the VRAM data on the maps, roads, and guidance display read from the memory device 30, the data memory 70, or the like. And the controller combines various data with the map data read from the VRAM. The display device 51 is a landscape widescreen including a liquid crystal display or a plasma screen, for example, and is capable of displaying a double screen under the control of the display controller 50.

The program memory 60 stores various programs to be performed in the navigation apparatus. These programs are performed by the controller 80. The program memory 60 may read the programs stored in the memory device 30 using a RAM, for example. Alternatively, the memory 60 may store the programs in a ROM. The contents of the programs include, e.g., a program 61 for performing a route search to the destination, a program 62 for performing settings and modification of maps to be displayed on the display device 51, or the like. Particularly, in the present invention, there is provided an access control program 63 for restricting the access operation to the memory device 30 depending upon an altitude of the vehicle, while accessing another memory device so as to perform a navigation function. This operation will be described below in detail.

The data memory 70 stores various computation results obtained by the controller 80, and data 71 on roads, maps, or the like read from the memory device 30. The data memory 70, when the controller 80 performs route search processing for a route to the destination, stores guidance route data 72 about a guidance route searched for, and the road traffic information 73 received from the VICS and FM multiple receiver 12. Particularly, in the present invention, when the vehicle is traveling a road located at an altitude exceeding about 3,000 m, the data memory 70 includes a backup memory area 74 serving as a backup memory for the memory device 30. Data required for navigation, including maps covering the periphery of regions or roads where the vehicle is traveling, is transferred from the memory device 30 to the backup memory area 74, and then the backup memory area 74 saves the data. The backup memory area 74 has a relatively larger capacity than any other memory area. The data memory 70 can preferably employ a DRAM, a SRAM, a flush memory, or the like, which has a large capacity. Preferably, an external memory 76 detachably connected to the navigation apparatus 1 may be used concomitantly with the data memory 70.

Now, the map data stored in the memory device 30 will be described in detail. The map data is expressed in units of drawing sheets, each of which is divided by a predetermined latitude and longitude. Each map data in units of drawing sheets is specified by designating a number of drawing sheet to be read. The map data of each drawing sheet includes (1) a drawing unit composed of various types of data needed for the map display, (2) a road unit composed of data needed for various types of processing, such as map matching, route search, route guidance, or the like, and (3) an intersection unit composed of detailed data on intersections. The road unit includes information on a link, i.e., a line connecting one intersection on the road and another adjacent intersection, and on a node, i.e., a point connecting two or more links. The information includes information on the latitude/longitude of the node, an altitude of the node, an attribute flag of the node indicating whether the node is an intersection node or not, or the like. The drawing unit includes data on a VICS conversion layer needed for specifying a corresponding road based on the road traffic information sent from the VICS center, data on a background layer needed for displaying buildings, rivers, or the like, and data on a character layer needed for displaying the names of a city, town, or village, the names of roads, and the like.

The navigation apparatus of the present invention, when the vehicle is traveling a road located at an altitude above 3,000 m, restricts the access to the memory device 30, while accessing the data memory 70. This is on the grounds that the clearance between a magnetic disk and a magnetic head of the memory device (hard disk drive) 30 might be affected by atmospheric pressure at high altitude (e.g., about 0.7 atm at an altitude of 3,000 m), and become narrow, thus leading to a failure in the magnetic disk. This operation will be described with reference to a flowchart of FIG. 3.

When the navigation apparatus 1 is powered (S101), so long as no instruction from the user is given, the navigation function is performed. As the vehicle travels, information on the present vehicle position is detected from the GPS receiver 10 or the like (S102). The positional information includes an altitude of the position as well as latitude and longitude thereof. The controller 80 checks or determines whether the altitude is above 3,000 m or not, according to the access control program 63 (S103). When the vehicle starts to travel a road located at an altitude above 3,000 m, the controller 80 provides the user a message that the vehicle is traveling at an altitude of 3,000 m or above, on the display device 51 or by the speaker 41 (S104). Then, the map data needed for the navigation and stored in the memory device 30 is transferred to the backup memory area 74 in the data memory 70 (S105). The transferred map data includes drawing sheets of predetermined areas covering the present vehicle traveling position and its surroundings, which sheets are all together stored in the memory area 74 with latitude and longitude of the position centered.

Then, the display controller 50 makes access not to the memory device 30, but to the backup memory area 74 of the data memory 70 under the direction of the controller 80 (S106), to display on the display device 51 a map covering the vehicle position and its surroundings and the vehicle mark superimposed on the map (S107). When an altitude of the vehicle position is above 3,000 m, the operations at steps S106 and S107 are repeated. If the altitude is equal to or less than 3,000 m (S108), then the access to the memory device 30 of the display controller 50 is permitted (S109) under the direction of the controller 80. With the navigation function being in an on state, the process returns to a step S102 and is repeated (S110).

Figure 3:
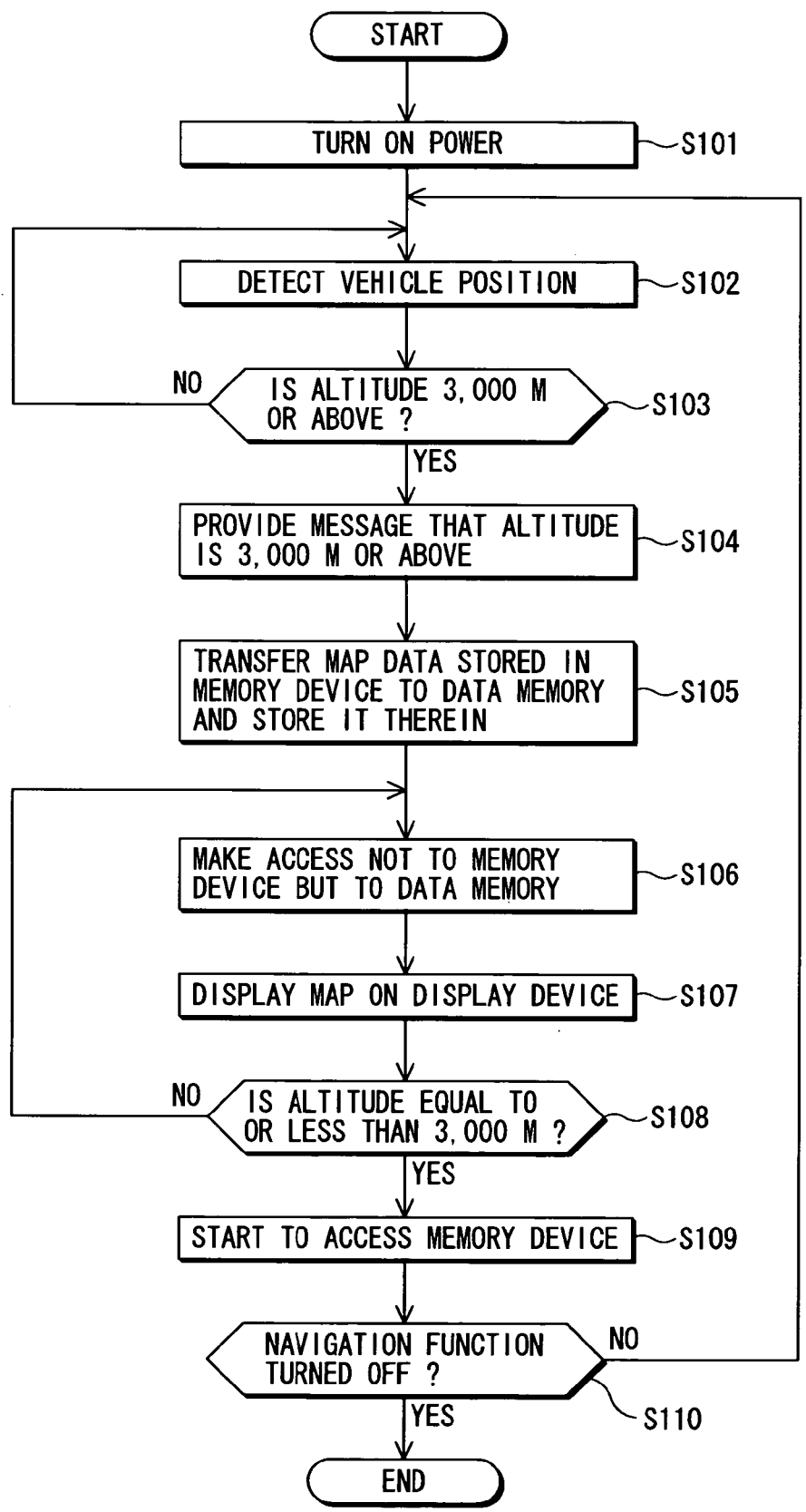
FIG. 3 is an operational flowchart according to a first embodiment of the present invention.
Figure 4:
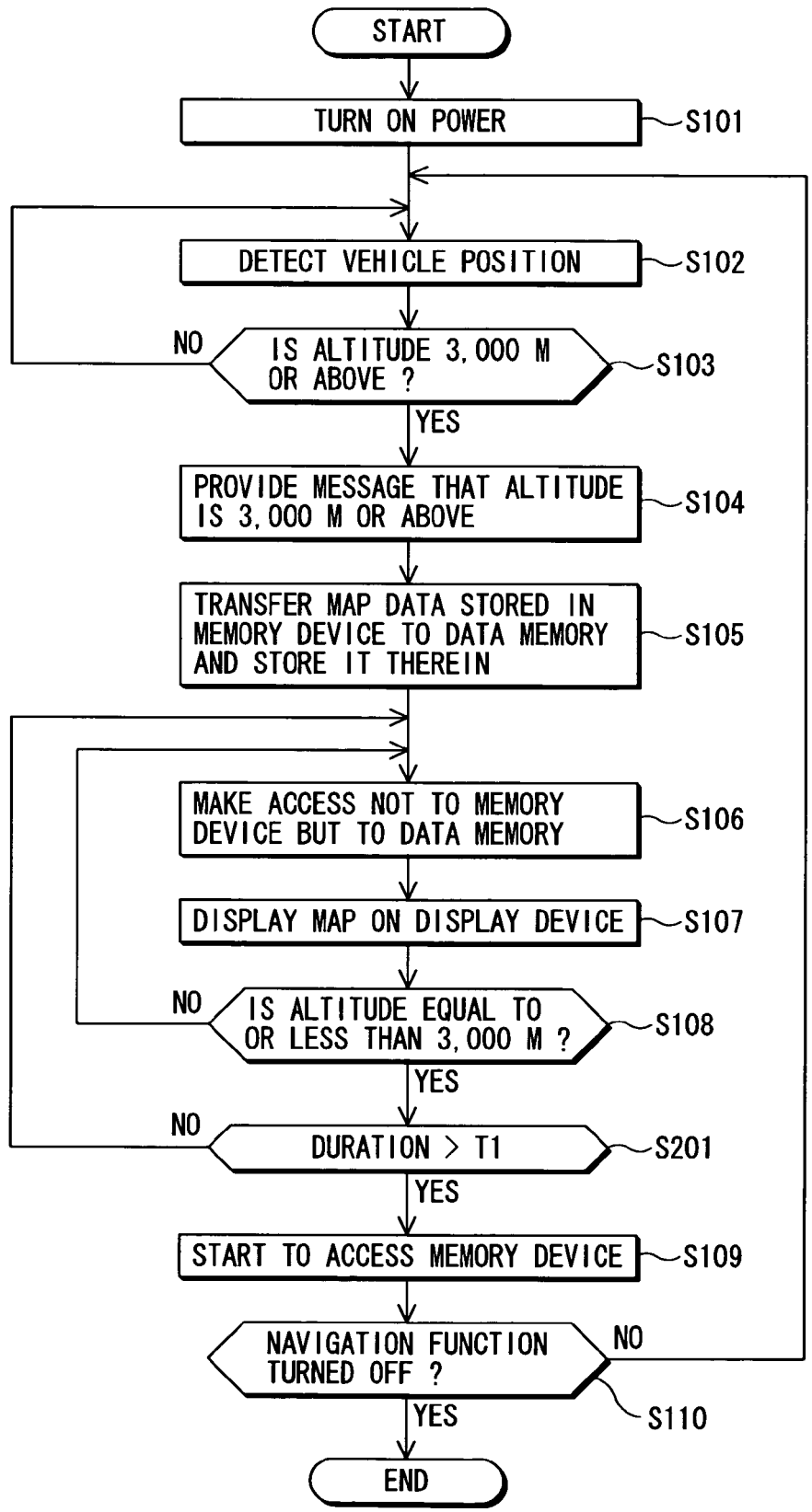
FIG. 4 is an operational flowchart according to a second embodiment of the present invention.

Now, the second preferred embodiment of the present invention will be shown in the following operational flowchart of FIG. 4. In this embodiment, between the steps S108 and S109 of FIG. 3 is added a step S201 at which it is determined whether a duration of restricting the access to the memory device 30 is larger than T1 or not. On some roads, after the vehicle travels a short part thereof located at an altitude above 3,000 m, it must travel a following part located at a lower altitude, and subsequently travel a part located at an altitude above 3,000 m again. If, every time the vehicle reaches the altitude of 3,000 m, the map data stored in the memory device 30 is transferred to the data memory 70, and the object to be accessed is changed, then the operation or process becomes troublesome. For this reason, once the access to the memory device 30 is restricted, this state will be maintained for at least predetermined interval T1.

Figure 5:
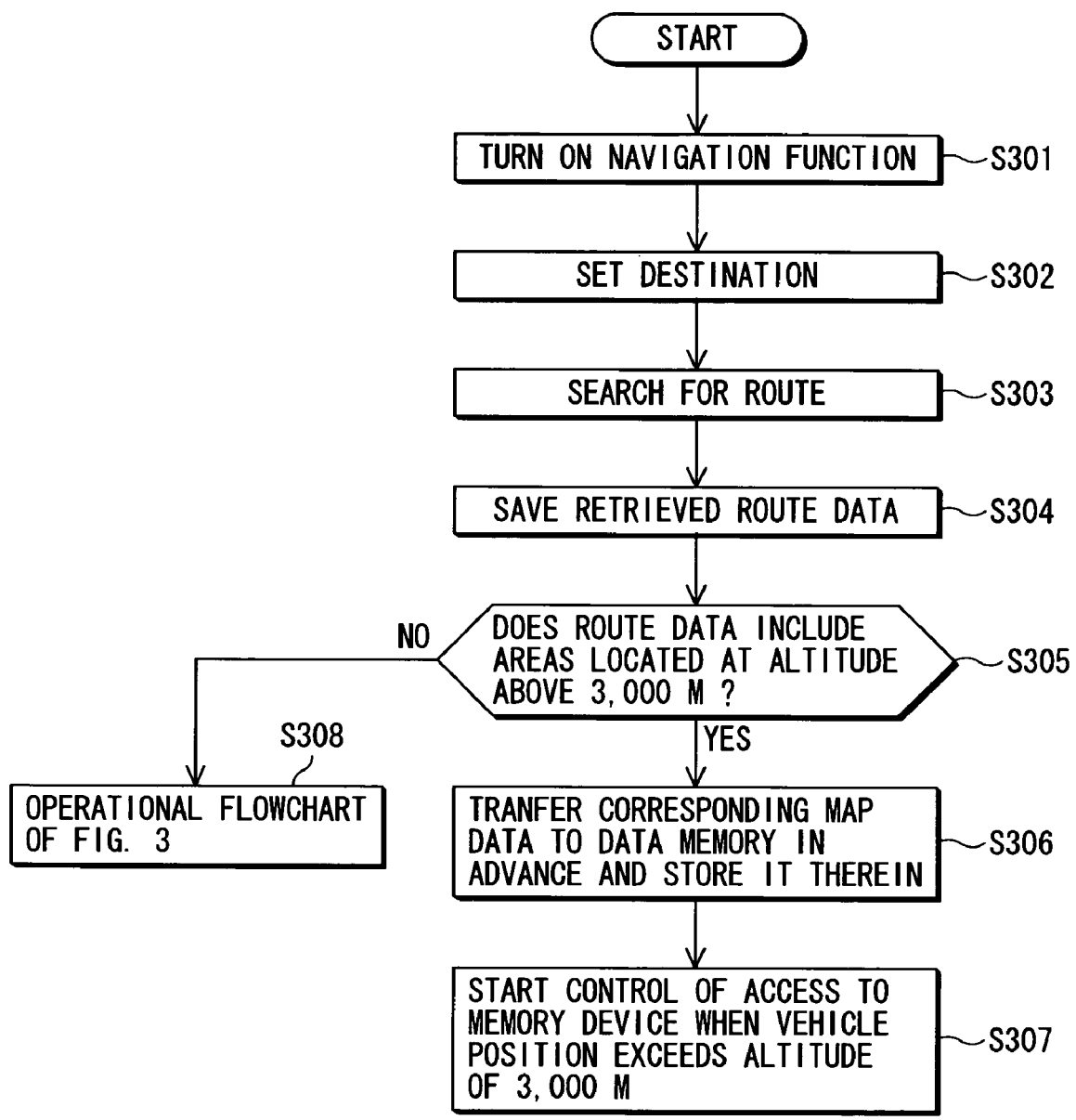
FIG. 5 is an operational flowchart according to a third embodiment of the present invention.

Next, the third preferred embodiment of the present invention will be shown in the following operational flowchart of FIG. 5. In the present embodiment, a preferred example in which a route setting to a destination has been executed will be described. With the navigation function being in the on state (S301), setting of the destination is performed (S302), and then a route search for a guidance route to the destination is performed by the controller 80 (S303). In the route search, a route which takes the lowest cost (or time) is calculated or obtained. Route data on the guidance route to the destination obtained by the route search is saved in the area 72 of the data memory 70 (S304). The controller 80 refers to the map data stored in the memory device 30, and determines whether the route data 72 includes a road located at an altitude above 3,000 m or not (S305). If the road located at the altitude above 3,000 m is included in the guidance route, map data covering the road at the altitude above 3,000 m and its surroundings is stored in the backup memory area 74 of the data memory 70 in advance (S306). When the vehicle reaches the altitude of 3,000 m, the access to the memory device 30 is restricted, and the data memory 70 may be controlled and accessed (S307). If the route data does not include any road located at the altitude above 3,000 m, the process advances in accordance with the operational flowchart of FIG. 3, wherein the access to the memory device 30 is controlled based on the flowchart (S308).

Figure 6:
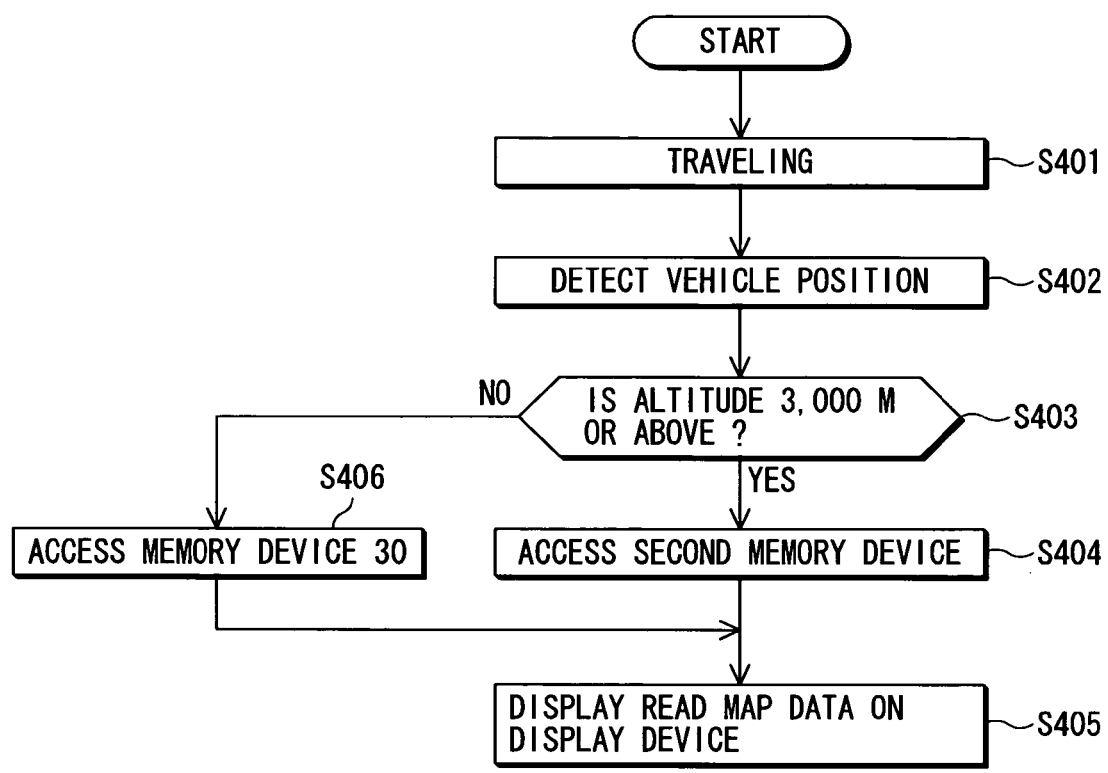
FIG. 6 is an operational flowchart according to a fourth embodiment of the present invention.

Now, the fourth preferred embodiment of the present invention will be shown in the following operational flowchart of FIG. 6. In the present embodiment, a nonvolatile memory for storing all map data about areas located at an altitude above 3,000 m is prepared as a second memory device. The second memory device is preferably, for example, a nonvolatile semiconductor memory, other than a hard disk, but may be a ROM, a RAM, or the like. The vehicle starts to travel (S401), and then the positional information on the vehicle is detected (S402). When the vehicle is positioned at an altitude above 3,000 m (S403), the object to be accessed so as to obtain the map data is switched from the memory device 30 to the second memory device (S404). Based upon the map data read from the second memory device, the map covering the present vehicle position and its surroundings is displayed on the display device 51 (S405). While the vehicle is traveling at an altitude not exceeding 3,000 m, the access to the memory device 30 is carried out (S406).

Although, in these embodiments, the altitude of the vehicle position is measured based upon the positional information from the GPS receiver 10, any other measuring method may be used. For example, a pressure sensor 90 may be positioned as shown in FIG. 1. When pressure measured by the sensor 90 is under a constant value, the map data stored in the memory device 30 may be transferred to the data memory 70, while the access to the memory device 30 may be restricted. In this case, atmospheric pressure corresponding to an altitude of 3,000 m is about 0.7 atm.

Further, the altitude of the vehicle position may be measured or calculated as follows. As the map data includes data on the altitude, the map data on drawing sheets corresponding to the point based upon the latitude and longitude thereof which is measured by the GPS receiver 10 is referred to, thereby obtaining the altitude of the vehicle position.

In cases where the navigation apparatus 1 has a further audio function, music data stored in the memory device 30 may be transferred to a memory area for music 75 of the data memory 70 to be stored therein. When the vehicle travels a road located at an altitude exceeding 3,000 m, an audio reproducing device reads the music data from the music memory area 75 of the data memory 70 without reading the data from the memory device 30, thereby reproducing it. For example, when an announcement indicative of the altitude exceeding 3,000 m is provided at the step S104 of FIG. 3, the music data to be transferred to the data memory 70 may be selected according to the user's selection of his/her desired piece of music from input devices 20, 21, and/or 22.

In the embodiments described above, when the vehicle position exceeds an altitude of 3,000 m, the access to the memory device 30 is restricted, which is one example. The altitude for this restriction may be set to a lower one, thereby widening the safety margin of the hard disk drive.

Figure 2:
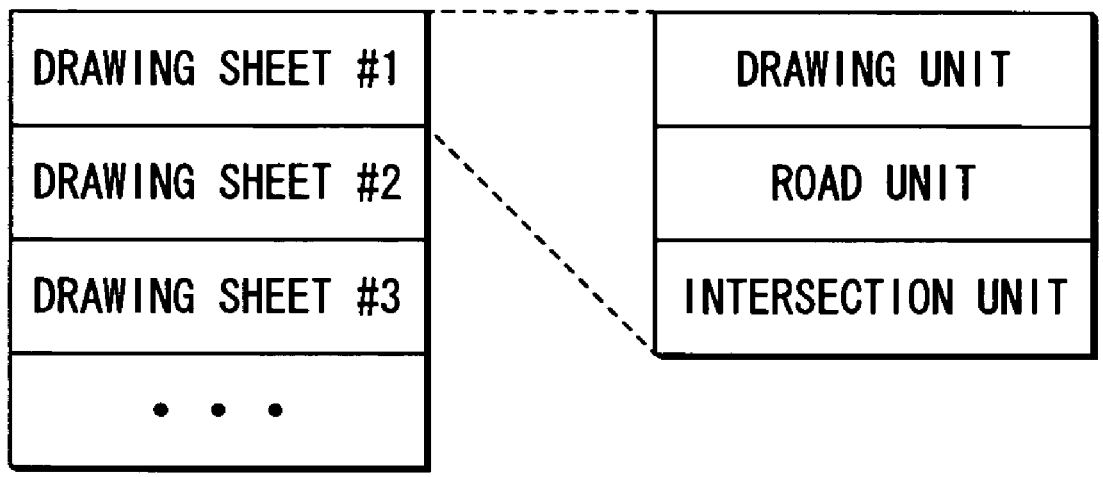
FIG. 2 shows the configuration of map data.

In the above mentioned embodiments, the route data obtained by performing the route search for the route to the destination is stored in the data memory 70. But, in cases where the route data is stored in the memory device 30, this route data is saved to the backup memory area 74 of the data memory 70 as the map data. It should be noted that, although one example of the map data is shown in FIG. 2, the map data according to the present invention includes a wide variety of data needed for the navigation, and should not be construed as limited to the data in the embodiments set forth herein.

In the described embodiments, the navigation apparatus 1 has the hard disk memory device 30. In the present invention, a drive for driving a DVD or a CD-ROM (or a writable RW or RAM) may be additionally provided.

Although the invention has been described with reference to the preferred embodiments, it is understood that the invention is not limited to the specific embodiments disclosed, and that various modifications and variants are intended to be included within the scope of the appended claim in the present invention.

According to the present invention, when the vehicle travels at or above a predetermined altitude, the access to the magnetic storage device is restricted, and the map data stored in the magnetic storage device is transferred to and stored in another memory device, so that this memory device can be accessed. This permits execution of the navigation function without a break even in high altitude areas or low pressure areas. Further, in such areas, the access to the magnetic storage device is restricted, thereby preventing a failure and breakage in the magnetic storage device.

What is claimed is:

1. A navigation apparatus having a function of searching for a route to a destination, comprising:
   a first memory section for storing map data;
   a second memory section capable of storing part of the map data stored within said first memory section;
   a position detector for detecting positional information of a vehicle;
   a memory controller for causing said part of the map data stored in said first memory section to be stored in said second memory section when the vehicle reaches a predetermined altitude based upon said positional information, the memory controller being operable to permit access of said part of the map data only from said second memory section and restrict access to said first memory section when the vehicle is above the predetermined altitude; and
   a display controller for displaying a map generated from the map data read from said second memory section on a display device.

2. The navigation apparatus according to claim 1, wherein said position detector comprises an altitude measuring section for measuring an altitude.

3. The navigation apparatus according to claim 1, wherein said position detector calculates the altitude of the vehicle based on the latitude and longitude of the vehicle position from the map data stored in said first memory section.

4. The navigation apparatus according to claim 1, wherein said memory controller causes the map data covering the position of the vehicle and its surroundings to be stored in said second memory section based upon said positional information.

5. The navigation apparatus according to claim 1, wherein said first memory section includes a hard disk drive (HDD).

6. The navigation apparatus according to claim 1, wherein said predetermined altitude is about 3,000 m.

7. The navigation apparatus according to claim 1, wherein the map data stored in said first memory section and said second memory section includes route data from which a guidance route to the destination can be obtained by performing a route search.

8. A navigation apparatus having a function of searching for a route to a destination, comprising:
   a first memory section for storing map data;
   a second memory section capable of storing part of the map data stored within said first memory section;
   a pressure measuring section for measuring atmospheric pressure at the location of a vehicle;
   a memory controller for causing said part of the map data stored in said first memory section to be stored within said second memory section when the atmospheric pressure measured by said pressure measuring section is equal to or less than a predetermined value the memory controller being operable to permit access of said part of the map data only from said second memory section and restrict access to said first memory section when the measured atmospheric pressure is less than the predetermined value; and
   a display controller for displaying a map generated from the map data read from said second memory section on a display device.

9. The navigation apparatus according to claim 8, wherein said predetermined value is about 0.7 atm.

10. The navigation apparatus according to claim 8, wherein said first memory section includes a hard disk drive.

11. A navigation apparatus having a function of searching for a route to a destination, comprising:
   a first memory device for storing map data;
   a second memory device for storing map data of areas located at or above a predetermined altitude;
   an altitude measuring section for measuring an altitude at the location of a vehicle;
   an access section for accessing only one of said first memory device or said second memory device and restricting access to the other based upon a result measured by said altitude measuring section; and
   a display controller for displaying a map generated from the map data read by said access section on a display device.

12. The navigation apparatus according to claim 11, wherein said first memory device includes a hard disk drive, and wherein said access section accesses said second memory device when it is determined that the vehicle has reached said predetermined altitude.

13. A navigation apparatus having a function of reproducing music, comprising:
   a magnetic storage medium for storing music data and map data;
   a memory device capable of storing the music data and the map data stored in said magnetic storage medium;
   a position detector for detecting positional information of a vehicle;
   a memory controller for causing the music data and the map data stored within said magnetic storage medium to be stored within said memory device when the vehicle reaches a predetermined altitude based upon said positional information and subsequently only permits access to the music data and the map data from said memory device and not from said magnetic storage medium if the vehicle remains at or above the predetermined altitude;
   an audio output device for playing music generated from the music data read from said memory device by sound; and a display controller for displaying a map generated from the map data read from said memory device on a display device.

14. A navigation apparatus having a function of guiding a vehicle along a route to a destination, comprising:
- a magnetic storage device for storing map data and route data to the destination;
- a memory device;
- a memory controller that, when said route data includes a road located at or above a predetermined altitude, transfers the map data of areas located at or above the predetermined altitude, from said magnetic storage device to said memory device and subsequently restricts access to the magnetic storage device while the vehicle is traveling a road located at or above the predetermined altitude; and
- a display controller for displaying on a display device a road map covering said areas, which are located at or above the predetermined altitude, based upon the map data stored within said memory device.

15. A method for accessing map data in a navigation apparatus having a function of guiding a vehicle along a route to a destination, comprising:
- measuring an altitude at a location where a vehicle is traveling;
- saving map data stored in a first memory to a second memory when the vehicle reaches a predetermined altitude and reading the map data stored within the second memory instead of reading the map data from the first memory as a function of altitude; and
- displaying a map generated from the read map data on a display device.

16. The access method according to claim 15, further comprising measuring, when the vehicle subsequently returns to or goes below the predetermined altitude, an interval during which it has been positioned above said predetermined altitude,
wherein, if said interval is shorter than a predetermined interval, then the access to the second memory is continued.

17. The access method to map data according to claim 15, wherein said first memory is a hard disk drive.

18. The access method to map data according to claim 15, wherein said second memory is a semiconductor memory.

19. The access method according to claim 15, wherein said altitude is about 3,000 m.

20. A method for accessing data in a navigation apparatus having a function of reproducing music, comprising:
- measuring an altitude at a vehicle location;
- saving music data and map data stored within a first memory to a second memory when the vehicle reaches a predetermined altitude and subsequently reading the data stored within the second memory;
- restricting access to the first memory while the vehicle remains at or above the predetermined altitude;
- playing music generated from the music data read from the second memory; and
- displaying a map generated from the map data read from the second memory on a display device.

* * * * *

UNITED STATES PATENT AND TRADEMARK OFFICE
CERTIFICATE OF CORRECTION

| | | |
|---|---|---|
| PATENT NO. | : 7,171,305 B2 | Page 1 of 1 |
| APPLICATION NO. | : 10/823392 | |
| DATED | : January 30, 2007 | |
| INVENTOR(S) | : Junji Minato et al. | |

It is certified that error appears in the above-identified patent and that said Letters Patent is hereby corrected as shown below:

<u>In the Claims</u>

Column 10, in claim 8, line 12 immediately after "than a predetermined value" insert --,-- (comma).

Signed and Sealed this

Twenty-fourth Day of April, 2007

JON W. DUDAS
*Director of the United States Patent and Trademark Office*